(12) United States Patent
Van Ert et al.

(10) Patent No.: US 6,338,618 B1
(45) Date of Patent: Jan. 15, 2002

(54) APPARATUS FOR MOLDING ARTICLES

(75) Inventors: Jack M. Van Ert, Rochester Hills, MI (US); George B. Byma, Haar (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/551,789

(22) Filed: Apr. 18, 2000

Related U.S. Application Data

(63) Continuation-in-part of application No. 09/048,496, filed on Mar. 26, 1998, now Pat. No. 6,146,578, which is a continuation-in-part of application No. 08/948,344, filed on Oct. 9, 1997, now Pat. No. 5,928,597.

(51) Int. Cl.[7] ......................... B29C 43/56; B29C 33/26; B29C 43/58
(52) U.S. Cl. ..................... 425/3; 249/170; 425/171; 425/405.1; 425/520
(58) Field of Search ................. 425/389, 390, 425/405.1, 520, 3, 171, 521; 249/170

(56) References Cited

U.S. PATENT DOCUMENTS

| | | | |
|---|---|---|---|
| 3,476,377 A | * 11/1969 | Agrista et al. | 425/405.1 |
| 3,833,333 A | * 9/1974 | Britten | 425/405.1 |
| 3,887,312 A | 6/1975 | Seary | |
| 4,234,373 A | * 11/1980 | Reavill et al. | 425/405.1 |
| 4,267,142 A | * 5/1981 | Lankheet | 264/510 |
| 4,385,877 A | 5/1983 | Tanabe | |
| 4,439,392 A | * 3/1984 | Schutzler et al. | 425/405.1 |
| 4,447,201 A | * 5/1984 | Knudsen | 425/389 |
| 4,533,555 A | 8/1985 | Harris | |
| 4,666,387 A | 5/1987 | Yokota et al. | |
| 4,786,351 A | * 11/1988 | Elliot et al. | 425/405.1 |
| 4,867,924 A | * 9/1989 | Schilkey et al. | 425/405.1 |
| 5,194,197 A | 3/1993 | Munk et al. | |
| 5,206,033 A | 4/1993 | Stastny | |
| 5,264,163 A | 11/1993 | Lemelson | |
| 5,322,430 A | 6/1994 | Kasai et al. | |
| 5,332,384 A | 7/1994 | Abramat | |
| 5,352,394 A | 10/1994 | Fujita et al. | |
| 5,411,686 A | 5/1995 | Hata | |
| 5,419,858 A | 5/1995 | Hata et al. | |
| 5,445,864 A | * 8/1995 | Neu | 249/170 |
| 5,451,151 A | * 9/1995 | Russell | 249/170 |
| 5,462,786 A | * 10/1995 | Van Ert | 156/212 |
| 5,518,389 A | 5/1996 | Nonomura et al. | |
| 5,591,289 A | * 1/1997 | Souders et al. | 264/258 |
| 5,629,032 A | 5/1997 | Pennino | |
| 5,639,405 A | 6/1997 | Erikson | |
| 5,639,490 A | 6/1997 | Travaglini | |
| 5,733,585 A | 3/1998 | Vandewinckel et al. | |
| 5,766,641 A | 6/1998 | Rivi et al. | |
| 5,776,522 A | 7/1998 | Budnick | |
| 5,786,002 A | 7/1998 | Dean et al. | |

\* cited by examiner

*Primary Examiner*—Robert Davis
(74) *Attorney, Agent, or Firm*—Brooks & Kushman PC

(57) ABSTRACT

An apparatus for forming an article from at least one layer of formable material includes a mold for receiving the at least one layer of formable material. The mold has first and second thin mold sections and a seal associated with at least one of the mold sections for effecting a sufficiently sealed relationship between the mold sections. Each mold section has a non-planar configuration, and one mold section has at least one aperture. A vacuum source is in fluid communication with the at least one aperture for applying a vacuum pressure to the at least one aperture when the mold sections are sufficiently sealed together in order to reduce air pressure within the mold. As a result, ambient air pressure is used to forcefully bias the mold sections sufficiently together so as to form the at least one layer of formable material to a contour corresponding to the non-planar configurations of the mold sections. Furthermore, each mold section is sufficiently rigid such that the mold sections do not substantially flex when the mold sections are forcefully biased together.

21 Claims, 5 Drawing Sheets

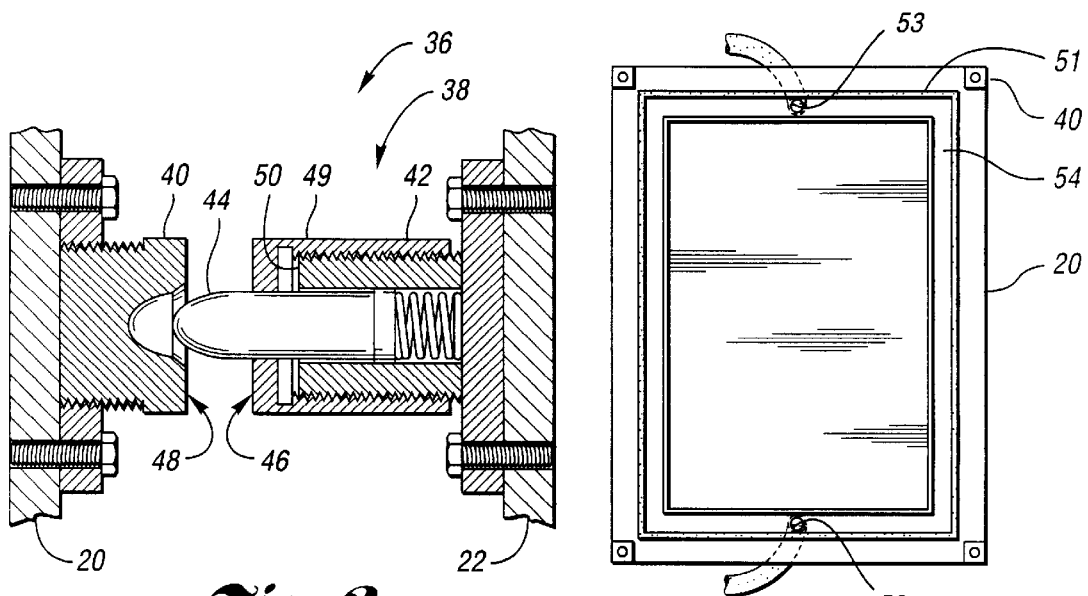
*Fig. 2*
*Fig. 3*
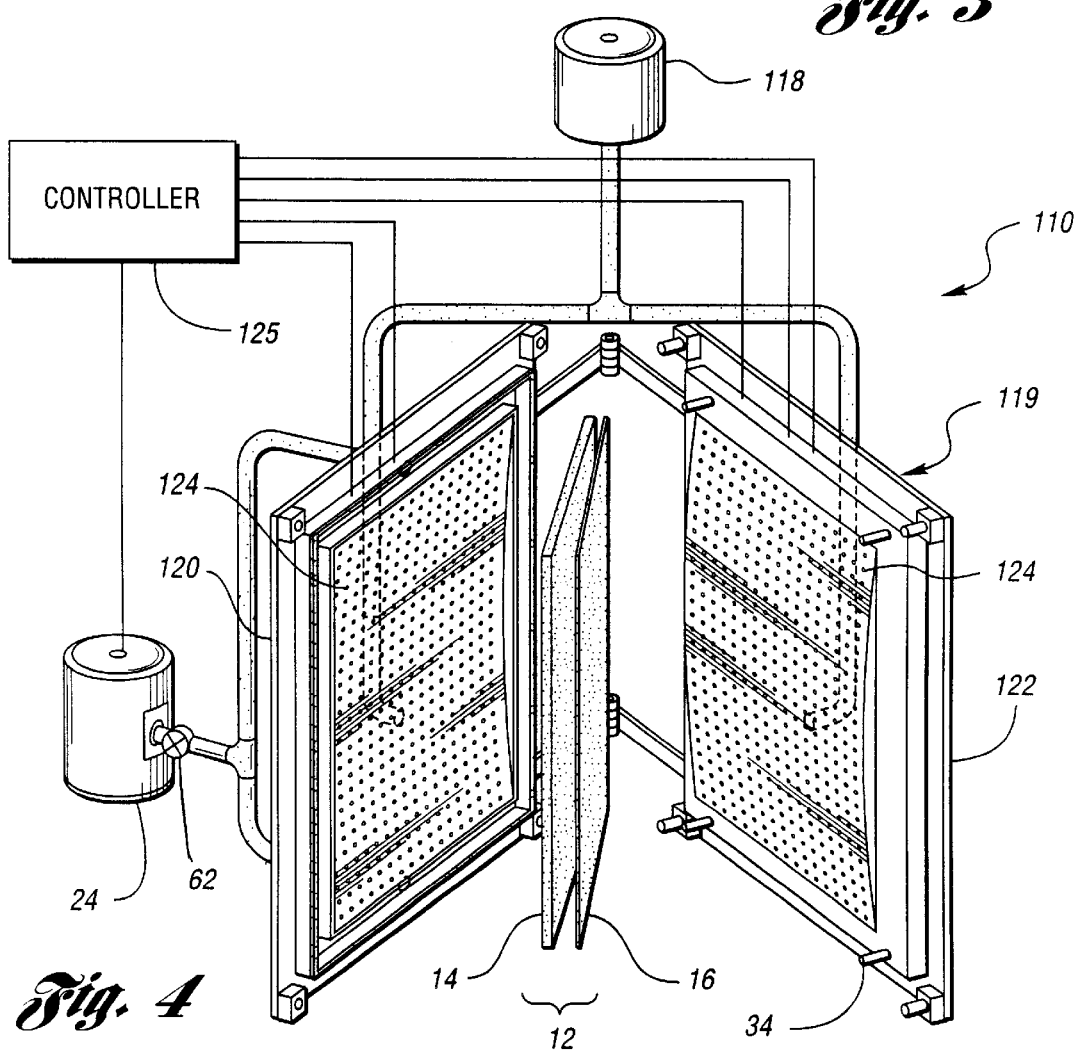
*Fig. 4*

APPARATUS FOR MOLDING ARTICLES

CROSS-REFERENCE TO RELATED APPLICATIONS

This application is a continuation-in-part of application Ser. No. 09/048,496 filed on Mar. 26, 1998, and now U.S. Pat. No. 6,146,578 which was a continuation-in-part of application Ser. No. 08/948,344 filed on Oct. 9, 1997 and now U.S. Pat. No. 5,928,597.

TECHNICAL FIELD

The invention relates to an apparatus for molding articles, wherein the apparatus includes mold sections that are forcefully biased together by ambient air pressure.

BACKGROUND ART

A common method of thermoforming articles is compression molding. For example, compression molding is used to make headliners that cover the interior surface of a motor vehicle roof.

A typical apparatus used in compression molding headliners includes a pair of relatively thick mold halves that are forced together by a press. Known mold halves comprising metal are relatively heavy and expensive to manufacture. On the other hand, mold halves comprising epoxy require a considerable amount of time to cool. As a result, cycle time per part is significant. Furthermore, the press used to compress such mold halves together is relatively large and expensive.

U.S. Pat. No. 4,327,049 discloses another apparatus for making headliners that includes a mold having a pair of thermally regulated mold halves. These mold halves have a plurality of passages through which coolant fluid is routed to adequately cool the mold. Consequently, this apparatus is costly to manufacture and use.

DISCLOSURE OF INVENTION

The present invention addresses the shortcomings of the prior art by providing a low cost apparatus for forming articles, such as headliners, from at least one layer of formable material. The apparatus includes a mold for receiving the at least one layer of formable-material. The mold has first and second thin mold sections and a seal associated with at least one of the mold sections for effecting a sufficiently sealed relationship between the mold sections. Each mold section has a non-planar configuration, and one mold section has at least one aperture. A vacuum source is in fluid communication with the at least one aperture for applying a vacuum pressure to the at least one aperture when the mold sections are sufficiently sealed together in order to reduce air pressure within the mold. As a result, ambient air pressure is used to forcefully bias the mold sections sufficiently together so as to form the at least one layer of formable material to a contour corresponding to the non-planar configurations of the mold sections. Furthermore, each mold section is sufficiently rigid such that the mold sections do not substantially flex when the mold sections are forcefully biased together.

While the seal may have any suitable configuration and comprise any suitable material, in one embodiment of the apparatus, the seal comprises a flange portion formed as part of one of the mold sections. The flange portion is configured to overlap the other mold section when the mold sections are moved sufficiently close together. Alternatively or supplementally, the seal may also comprise a compressible seal and/or a blade seal attached to one or both of the mold sections.

One mold section may also have a peripheral channel in communication with the at least one aperture. Such a channel enables a vacuum to initially be drawn along the periphery of the mold, which is particularly advantageous in the event the article comprises substantially impermeable materials.

A portion, such as a peripheral portion, of at least one of the mold sections may comprise a flexible material. Such a design is advantageous, for example, in forming rounded edges or other features on the article.

In one embodiment of the apparatus, the mold sections are pivotally connected together such that at least one mold section is pivotable toward the other mold section. In this embodiment, the mold is preferably provided with a locator for aligning the mold sections as the at least one mold section is pivoted toward the other mold section. The locator includes a locating pin assembly connected to the first mold section, and a receptacle connected to the second mold section. Furthermore, the locating pin assembly includes a bullet-shaped locating pin that is engageable with the receptacle.

The locating pin assembly may also include a housing for receiving the locating pin such that the locating pin is moveable with respect to the housing. With such a configuration, the at least one mold section may continue to pivot toward the other mold section after the locating pin has engaged the receptacle.

Additionally, the locator preferably functions as a mold stop. For example, the housing may be provided with a first engaging surface, and the receptacle may be provided with a second engaging surface engageable with the first engaging surface. When the engaging surfaces are engaged with each other, pivotal movement of the at least one mold section toward the other mold section is inhibited.

Preferably, the mold further includes a mold gap measurement device for determining gap thickness between the mold sections. The mold gap measurement device may include, for example, a magnet connected to one mold section, and a magnetic force detection device connected to the other mold section.

The apparatus may also comprise a controller in communication with the mold gap measurement device and the vacuum source. The controller is preferably operable to control the vacuum pressure applied by the vacuum source based on the gap thickness between the mold sections.

Furthermore, the apparatus may include a heating device for heating the at least one layer of formable material, and one of the mold sections may include at least one temperature measurement device in communication with the heating device for determining temperature of a portion of the at least one layer of formable material. With such an arrangement, the heating device may be controlled based on temperature readings provided by the at least one temperature measurement device.

Further under the invention, an apparatus for forming an article from at least one layer of formable material includes a mold for receiving the at least one layer of formable material. The mold has first and second mold sections pivotally connected together, and a compressible seal disposed between the mold sections. Each mold section has a non-planar configuration, and one mold section has at least one aperture and a peripheral channel in communication with the at least one aperture. A vacuum source is in fluid communication with the at least one aperture and the channel for reducing air pressure within the mold. As a result, ambient air pressure is used to forcefully bias the mold sections sufficiently together and compress the seal, so as to form the at least one layer of formable material to a contour corresponding to the non-planar configurations of the mold sections. Each mold section is sufficiently rigid such that the mold sections do not substantially flex when the mold sections are forcefully biased together.

More specifically, an apparatus according to the invention for forming an article from at least one layer of formable material includes a frame assembly having first and second frame portions. The frame portions are pivotally connected together such that at least one of the frame portions is pivotable with respect to the other frame portion between an open position and a closed position. The frame assembly further includes an inflatable device connected to the first frame portion. The apparatus also includes a mold for receiving the at least one layer of formable material. The mold includes first and second mold sections and a seal associated with at least one of the mold sections. The first mold section is cooperable with the inflatable device such that the first mold section is moveable with respect to the first frame portion upon inflation of the inflatable device. The second mold section is connected to the second frame portion. Each mold section has a non-planar configuration, and one mold section has at least one aperture. A vacuum source in fluid communication with the at least one aperture. When the at least one frame portion is in the closed position, the inflatable device is operable for moving the first mold section toward the second mold section to effect a sufficiently sealed relationship between the mold sections. Furthermore, the vacuum source is operable for reducing air pressure within the mold to thereby cause ambient air pressure to forcefully bias the mold sections sufficiently together so as to form the at least one layer of formable material to a contour corresponding to the non-planar configurations of the mold sections. Each mold section is sufficiently rigid such that the mold sections do not substantially flex when the mold sections are forcefully biased together.

Numerous applications for the present invention are contemplated. For example, the present invention may be used to secure a cover member to a preheated plastic sheet while forming the plastic sheet. Furthermore, the invention may be used with both thermosets and thermoplastic materials.

These and other objects, features and advantages of the invention are readily apparent from the following detailed description of the best modes for carrying out the invention when taken in conjunction with the accompanying drawings.

BRIEF DESCRIPTION OF DRAWINGS

FIG. 2 is a sectional view of one of the floating locators;

FIG. 3 is a side view of a mold section showing a pair of vacuum apertures and a vacuum channel;

FIG. 4 is a perspective view of a second embodiment of the apparatus;

BEST MODES FOR CARRYING OUT THE INVENTION

Figure 1:
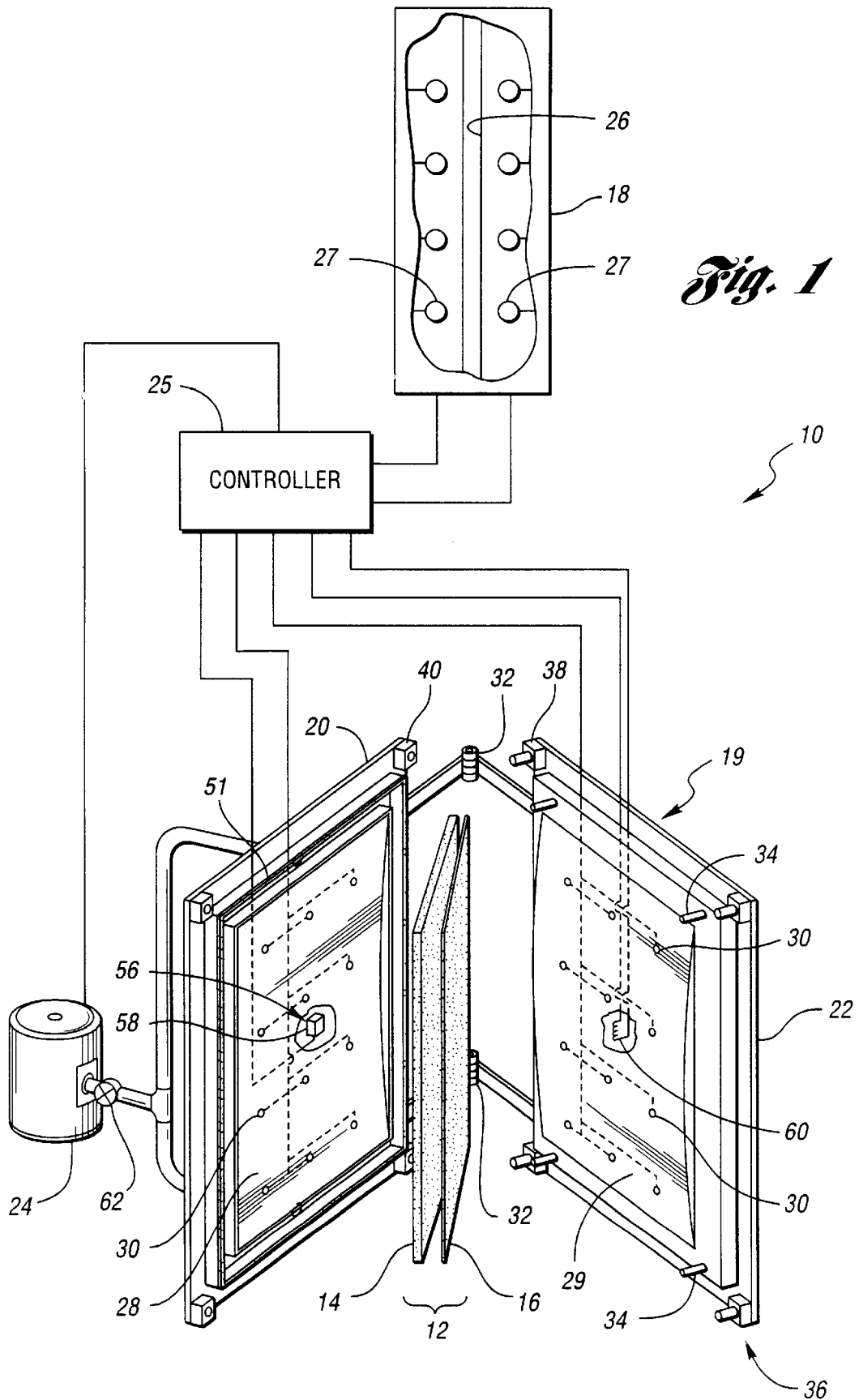
FIG. 1 is a perspective view of an apparatus according to the invention for forming an article such as a motor vehicle headliner, wherein the apparatus includes a mold having a pair of mold sections or sections pivotally connected together, and a plurality of floating locators for aligning the mold sections as they are pivoted toward each other.

The present invention has been termed "twin shell vacuum molding." FIG. 1 shows an apparatus 10 according to the invention for forming a motor vehicle headliner 12, which includes a formable layer 14 and a cover member 16. The apparatus 10 comprises a heating device or source such as an oven 18, a mold 19 having a pair of vertically oriented mold sections such as halves 20 and 22, a vacuum source 24 and a controller 25 in electrical communication with the oven 18, mold 19 and vacuum source 24. The apparatus 10 is preferably arranged so that the oven 18 is disposed above the mold halves 20 and 22 to reduce floor space requirements. Alternatively, the oven 18 and mold halves 20 and 22 can be horizontally or otherwise oriented.

The formable layer 14 may be any permeable or impermeable formable material which when sufficiently heated has a forming and/or compressive strength less than the ambient air pressure surrounding the apparatus 10. Such materials include thermoformable rigid urethane (TRU), polyethylene terephthalate (PET) and other formable plastic materials. Furthermore, multiple formable layers 14 may be utilized to form a headliner.

The cover member 16 preferably comprises nonwoven PET, but it may comprise any suitable permeable or impermeable cover material such as cloth, vinyl, thermoplastic olefin (TPO), or carpet. Alternatively, the cover member 16 may be eliminated if the characteristics of the formable layer 14 are aesthetically satisfactory.

The oven 18 has a slot 26 for receiving one or more formable layers 14 and/or the cover member 16. A plurality of heating elements 27 are disposed on each side of the slot 26. The heating elements 27, which may be radiant elements, hot air nozzles, steam nozzles, or any other suitable heating elements, are preferably arranged in a first pattern or array on each side of the slot 26. For example, the oven 18 may include four rows of heating elements 27 on each side of the slot 26, with each row including three heating elements 27.

With such a configuration, the oven 18 may be used to selectively heat the formable layer 14 and/or the cover member 16. For example, peripheral portions of the formable layer 14 may be heated to higher temperatures than central portions of the formable layer 14 to account for uneven cooling of the formable layer 14, which may occur when the formable layer 14 is transferred from the oven 18 to the mold 19. As another example, a portion of the formable layer 14 that will experience a relatively deep draw, may be heated to a relatively higher temperature than surrounding portions of the formable layer 14.

The mold halves 20 and 22 are relatively thin, with a thickness preferably, but not necessarily, in the range of 0.25 to 1.0 inches. Furthermore, each mold half 20 and 22 is relatively light, preferably in the range of 0.5 to 10 pounds per square foot of mold half surface area. The mold halves 20 and 22 preferably comprise epoxy resin, but they may be made of any other suitable material such as aluminum or nickel.

As shown in FIG. 1, the mold halves 20 and 22 preferably have predetermined non-planar surfaces 28 and 29, respectively, for forming the formable layer 14 and cover member 16 into the desired shape. The mold halves 20 and 22 are also preferably sufficiently rigid so that they do not substantially flex when forcefully biased together. Consequently, the mold halves 20 and 22 are able to accurately form the headliner into the desired shape with closely controlled tolerances. This can also be achieved when at least a portion, such as a peripheral portion, of at least one of the mold halves 20 and 22 comprises a relatively flexible material which readily collapses when subject to an external compressive force. Such a design is advantageous, for example, in forming rounded edges or other features on the headliner.

The mold halves 20 and 22 each have a plurality of temperature measurement devices, such as thermocouples 30, disposed at the surfaces 28 and 29, respectively. The thermocouples 30 are configured to obtain temperature measurements or readings of portions of the formable layer 14 and/or cover member 16. Preferably, the thermocouples 30 on each surface 28 and 29 are arranged in a second pattern or array corresponding to the first array of heating elements 27. Furthermore, the thermocouples 30 are in communication with the controller 25 so as to provide temperature readings to the controller 25.

Based on temperature readings provided to the controller 25 during one molding cycle, the controller 25 may adjust heat output of one or more of the heating elements 27 to ensure that formable layers 14 and/or cover members 16 used in subsequent molding cycles are properly heated for a particular application. Because each thermocouple 30 preferably corresponds to a particular heating element 27, the oven 18 may be accurately controlled to selectively heat formable layers 14 and/or cover members 16 to be used in the subsequent molding cycles.

A pair of hinges 32 pivotally connect the mold halves 20 and 22 together to allow opening and closing of the mold 19. Alternatively, the mold halves 20 and 22 can be mounted on slides, cylinders, or any other mounting arrangement known to those skilled in the art, or each of the mold halves can be free standing. The mold half 22 also has a plurality of collapsible or displacable pins 34 for holding the formable layer 14 and the cover member 16 within the mold 19.

As shown in FIGS. 1 and 2, the mold 19 may be provided with a plurality of floating locators 36 for aligning the mold halves 20 and 22 as the mold halves 20 and 22 are moved toward each other. Each floating locator 36 includes a locating pin assembly 38 attached to the mold half 22, and a mating receptacle 40 attached to the mold half 20. Preferably, the mold 19 is provided with a locating pin assembly 38 at each corner of the mold half 22, and a mating receptacle 40 at each corner of the mold half 20.

Each locating pin assembly 38 includes a housing 42 and a bullet-shaped locating pin 44 movably associated with the housing 42 such that at least a portion of the locating pin 44 may retract into the housing 42. With such a configuration, as the mold halves 20 and 22 are pivoted toward each other, the locating pins 44 are able to rotate into engagement with the receptacles 40. Once the locating pins 44 are seated within the receptacles 40, the locating pins 44 may retract into the housings to permit additional movement of the mold halves 20 and 22 toward each other.

The floating locators 36 are also preferably configured to function as mold stops for inhibiting movement of the mold halves 20 and 22 toward each other. For example, each housing 42 preferably has a first engaging surface 46, and each receptacle 40 preferably has a second engaging surface 48 engageable with a corresponding first engaging surface 46. When the engaging surfaces 46 and 48 are in contact with each other, movement of the mold halves 20 and 22 toward each other is effectively limited proximate at least the corners of each mold half 20 and 22.

As shown in FIG. 2, each housing 42 is adjustable with respect to the mold half 22, and each receptacle is adjustable with respect to the mold half 20 so that final spacing of the mold halves 20 and 22 may be adjusted. For example, each housing 42 may include a first or outer member 49 that is threadingly engaged with a second or inner member 50. With such a configuration, the outer member 49 may be rotated to adjust spacing of the first engaging surface 46 from the mold half 22. Similarly, each receptacle 40 may be threadingly engaged with a mounting plate and/or the mold half 20 so that each receptacle 40 may be rotated to adjust spacing of the second engaging surface 48 from the mold half 20.

As shown in FIG. 3, a seal 51 is disposed about the periphery of mold half 20 for creating a substantially gas or air-impermeable sealed relationship between the mold halves 20 and 22 when the seal is sufficiently compressed. The mold half 20 further has a pair of apertures 52 and 53 extending therethrough, and a vacuum channel 54 in fluid communication with the apertures 52 and 53. The vacuum channel 54 enables a vacuum to initially be drawn along the periphery of the mold 19, which is particularly advantageous in the event the headliner 12 comprises substantially impermeable materials. If the headliner 12 comprises sufficiently permeable materials, then the vacuum channel 54 may be eliminated from the mold half 20. Alternatively, one or both mold halves 20 and 22 may have one or more apertures and/or channels through which below-ambient air pressure can be developed in the mold 19.

The vacuum source 24 is in fluid communication with the apertures 52 and 53, and is adapted to reduce the pressure within the mold 19 below ambient air pressure. The vacuum source 24 preferably achieves a pressure drop within the mold 19 in the range of 0.5 to 10 pounds per square inch (psi), depending on the type of materials to be formed and/or compressed. Across a typical mold half surface area of about 2,500 to 4,500 square inches, ambient air pressure is therefore able to apply a compressive force of about 1,250 to 45,000 pounds for drawing the mold halves 20 and 22 together.

Depending on the size and material composition of the mold halves 20 and 22, as well as the desired pressure drop within the mold 19, the mold halves 20 and 22 may flex somewhat during a particular molding cycle. It is desirable to control and limit such flexion in order to accurately form the headliner 12 to the desired shape. Consequently, as shown in FIG. 1, the mold 19 is preferably provided with a mold gap measurement device 56 for determining distance between the mold halves 20 and 22, or mold gap, at a desired location or locations. Based on this mold gap information, the vacuum source 24 may then be controlled to achieve and maintain a desired mold gap so as to avoid undesirable flexion of the mold halves 20 and 22.

Preferably, but not necessarily, the mold gap measurement device 56 is used to determine mold gap proximate the center of the mold 19. The mold gap measurement device 56 may include, for example, a magnet 58 attached to the mold half 20 behind the surface 28, and a magnetic force detection device such as a coil 60 attached to the mold half 22 behind the surface 29 for measuring magnetic force of the magnet 58. As the distance between the mold halves 20 and 22 decreases, magnetic force detected by the coil 60 will increase.

Mold gap information may be provided to the controller 25 for controlling vacuum applied by he vacuum source 24. For example, the controller 25 may control operation of a valve 62, which may be provided as part of the vacuum source 24. Thus, as the mold halves 20 and 22 are forced together by ambient air pressure, the vacuum applied by the vacuum source 24 may be controlled to achieve and maintain the desired mold gap.

The controller 25 may be provided as a separate component, or as part of the oven 18, the mold 19 or the vacuum source 24. Alternatively, the oven 18, mold 19 and vacuum source 24 may each have a separate controller, and one or more of the separate controllers may be linked together, or to a main controller.

The method according to the invention for forming the headliner 12 will now be described. The formable layer 14 and the cover member 16 are first heated in the oven 18 to a predetermined temperature preferably in the range of 150° C. to 280° C., depending on the type of materials. Alternatively, heating of the cover member 16 may be eliminated, depending on the application, or the cover member 16 may be eliminated entirely if the characteristics of the formable layer 14 are aesthetically satisfactory.

After heating, the formable layer 14 and the cover member 16 are automatically or otherwise placed between the mold halves 20 and 22 and onto the displacable pins 34. Alternatively, the formable layer 14 and the cover member 16 may be supported in the mold 19 in any manner known to those skilled in the art, such as by mounting the formable layer 14 and the cover member 16 in a support frame which may be supported in the channel 54. As yet another alternative, the formable layer 14 and the cover member 16 may be supported by one of the mold halves 20 and 22 if, for example, the mold halves 20 and 22 are horizontally oriented. The mold halves 20 and 22 are then moved toward each other manually or otherwise so that the mold halves 20 and 22 are sufficiently sealed together.

Vacuum is then developed by the vacuum source 24 to reduce the air pressure within the mold 19 below ambient air pressure. As a result, ambient air pressure forces the mold halves 20 and 22 together, thereby thermoforming the headliner 12 while further compressing the seal 51. During the thermoforming process, the formable layer 14 and the cover member 16 are bonded together and are shaped into the desired contour of the headliner 12. Adhesives may also be used to improve the bond between the formable layer 14 and the cover member 16. Alternatively, the cover member 16 can be molded or otherwise attached to a previously formed formable layer or layers 14.

During the thermoforming process, the floating locators 36 and the mold gap measurement device 56 are used to control spacing between the mold halves 20 and 22, to thereby control compression of the formable layer 14 and the cover member 16. As described above, the floating locators 36 preferably function as mold stops at the corners of the mold 19. The mold gap measurement device 56, along with the controller 25, is preferably used to achieve and maintain a desired mold gap at, for example, the center of the mold 19.

The seal 51 may also be configured to control the compression range of the mold 19. For example, a relatively stiff seal may be used to reduce the compression range of the mold 19.

Because the mold halves 20 and 22 are relatively thin, the mold halves 20 and 22 are able to cool quickly without using embedded cooling lines. In addition, because the mold halves 20 and 22 are relatively thin and simple in construction, the mold halves are inexpensive to manufacture. Furthermore, because a press is not required to force the mold halves 20 and 22 together, the method and apparatus of the invention result in significantly reduced equipment costs compared with the prior art.

It is to be understood that the floating locators 36 and temperature measurement devices 30 described with respect to the apparatus 10, may also be used with the low pressure hydro molding apparatus disclosed in application Ser. No. 09/048,496, which is hereby incorporated by reference.

FIG. 4 shows a second embodiment 110 of the apparatus including a heating device such as a heat source 118, and a mold 119 having a pair of mold sections such as halves 120 and 122. In addition to having the features of the mold halves 20 and 22 of the mold 19, each of the mold halves 120 and 122 also has a plurality of apertures 124 in fluid communication with the heat source 118. The heat source 118 may be used to generate and blow steam, heated air, or other heated fluid into the mold 119 to heat the formable layer 14 and the cover member 16, if used. Furthermore, the heat source 118 is preferably in communication with the controller 25. Alternatively, the mold halves 120 and 22 can be thermally regulated in any suitable manner.

The formable layer 14 and the cover member 16, if used, are automatically or otherwise placed between the mold halves 120 and 122 and onto the displacable pins 34. The mold halves 120 and 122 are then moved toward each other manually or otherwise so that the mold halves 120 and 122 are sufficiently sealed together. Next, heated fluid is generated by the heat source 118, and the fluid is blown into the mold 119 to heat the formable layer 14 and the cover member 16 to approximately 150° C. to 280° C., depending on the type of materials. The thermocouples (not shown) may be used in conjunction with the controller 25 to control heating of the formable layer 14 and cover member 16. Consequently, the formable layer 14 and the cover member 16 may not require preheating prior to being inserted into the mold 119. Vacuum is then developed by the vacuum source 24 to reduce the air pressure within the mold 119 below ambient air pressure. As a result, ambient air pressure forces the mold halves 120 and 122 together, thereby thermoforming the headliner 12 while further compressing the seal 51.

Referring to FIGS. 5 through 9, a third embodiment 210 of the apparatus will now be described. The apparatus 210 includes a frame assembly 212 having first and second frame portions 214 and 216, respectively, and a mold 218 having first and second mold sections such as halves 220 and 222, respectively, associated with the frame portions 214 and 216 as explained below in detail. The frame portions 214 and 216 are pivotally connected together such as with one or more hinges 223. The second frame portion 216 is pivotable with respect to the first frame portion 214 between an open position shown in FIGS. 5 and 6 and a closed position shown in FIG. 7. An actuator such as a hydraulic cylinder 224 is preferably connected between the frame portions 214 and 216 to facilitate movement of the second frame portion 216. The frame assembly 212 also includes a plurality of stops 225 for inhibiting movement of the second frame portion 216 beyond the closed position. Each stop 225 may comprise an alignment pocket 226 attached to the first frame portion 214, and an alignment pin 227 connected to the second frame portion 216 and engageable with the alignment pocket 226. Alternatively, the frame assembly 212 may be configured such that both frame portions 214 and 216 may be pivotable with respect to each other.

Although the frame portions 214 and 216 are shown as open structures, it is to be understood that the frame portions 214 and 216 may be configured in any suitable maimer such as sealed enclosures. With such a configuration, the frame assembly 212 may also be provided with spray heads (not shown) for spraying a fine water mist on back surfaces of the mold sections 220 and 222. An air dryer (not shown) may also be provided in fluid communication with the frame portions 214 and 216 for facilitating evaporation of the water mist so as to cool the mold sections 220 and 222.

The frame assembly 212 further includes a mold displacement device such as an inflatable device or bladder system 228. The bladder system 228 includes first and second inflatable bags or bladders 229 and 230, respectively. The first and second bladders 229 and 230, respectively, are disposed in first and second troughs 231 and 232, which are connected to the first frame portion 214. The bladder system 228 further includes a manifold 234 in fluid communication with the bladders 229 and 230, and a fluid source such as a compressed air source 236 connected to the manifold 234 for inflating the bladders 229 and 230. Alternatively, the mold displacement device may be any suitable device sufficient to move at least one of the mold halves 220 and 222 toward the other mold half. For example, the mold displacement device may comprise one or more hydraulic cylinders.

Figure 5:
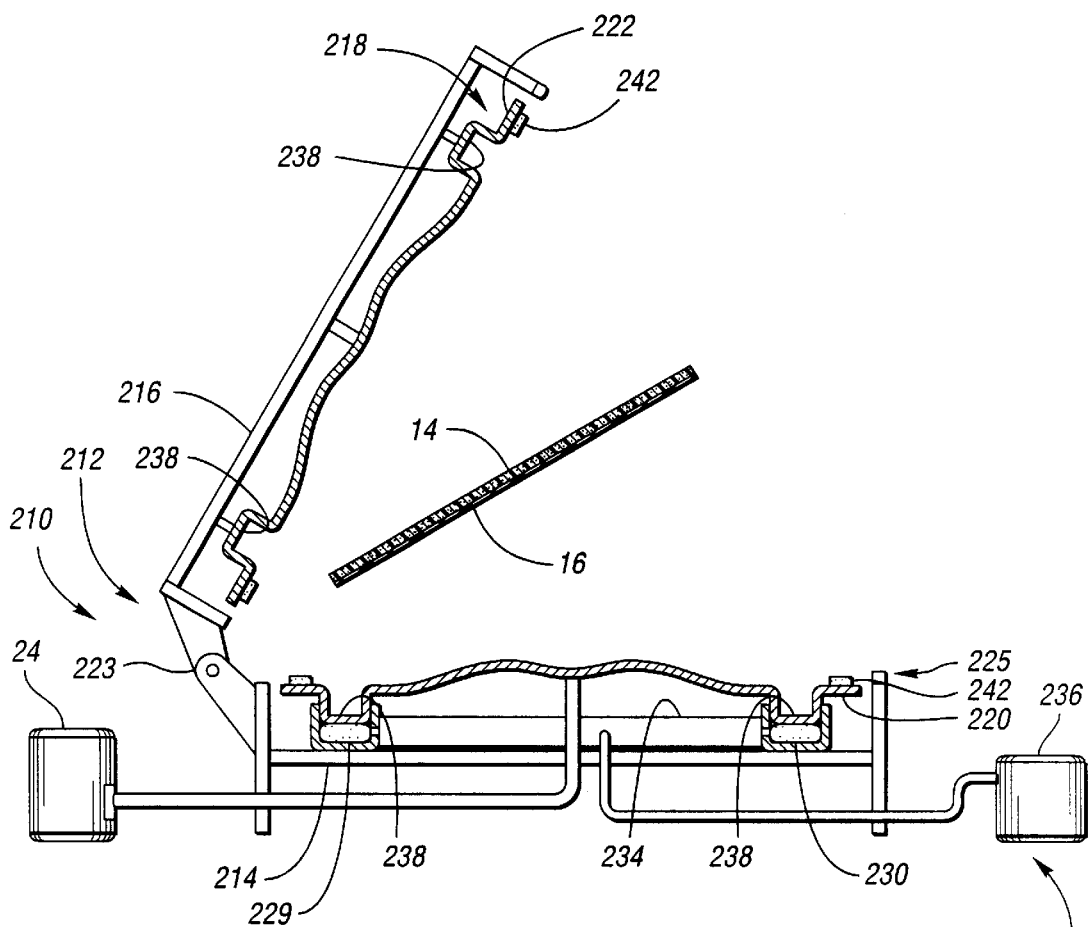
FIG. 5 is a sectional view of a third embodiment of the apparatus including a frame assembly having first and second frame portions, and a mold having first and second mold sections associated with the first and second frame portions, respectively, wherein the second frame portion is shown in an open position.

The first mold half 220 is supported by the bladders 229 and 230, and is moveable with respect to the first mold half 220 upon inflation of the bladders 229 and 230. The second mold half 222 is fixedly connected to the second frame portion 216 and is pivotable therewith. The mold halves 220 and 222 may include any and all of the features of the mold halves 20 and 22, or of the mold halves 120 and 122. As shown in FIG. 5, each mold half 220 and 222 preferably has a channel 238, and the channels 238 are in fluid communication with one or more apertures (not shown) in one or both of the mold halves 220 and 222.

A seal 242 is disposed about the periphery of each mold half 220 and 222 for creating a sufficiently sealed relationship between the mold halves 220 and 222 when the seals 242 are moved sufficiently close together. It is to be understood that a sufficiently sealed relationship may exist even though air is entering the mold 218 from the surrounding environment, as long as air exiting the mold 218 due to the vacuum source 24 sufficiently exceeds the air entering the mold 218 so that a desired pressure drop within the mold 218 may be achieved.

Figure 7:
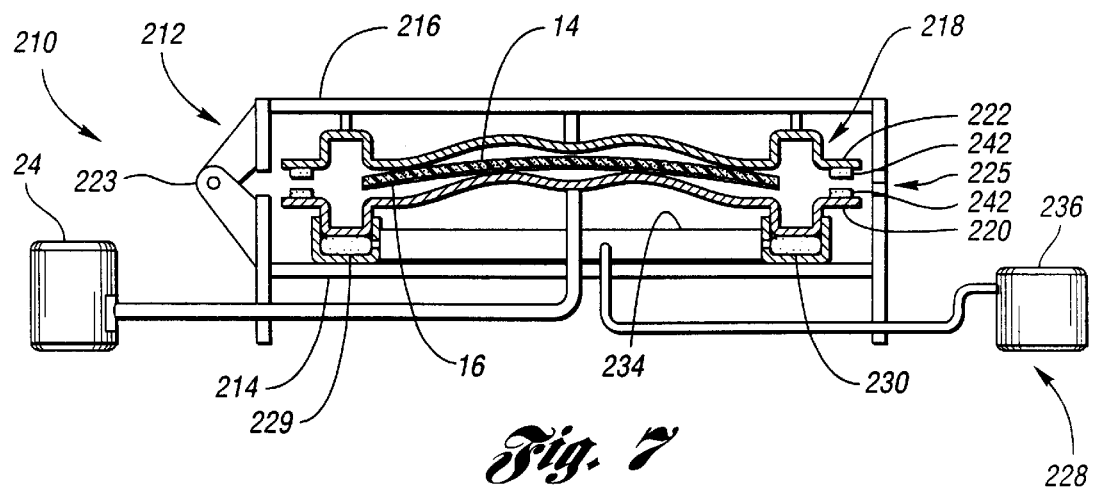
FIG. 7 is a sectional view of the apparatus showing the second frame portion in a closed position, and an inflatable bladder system disposed beneath the first mold section.
Figure 6:
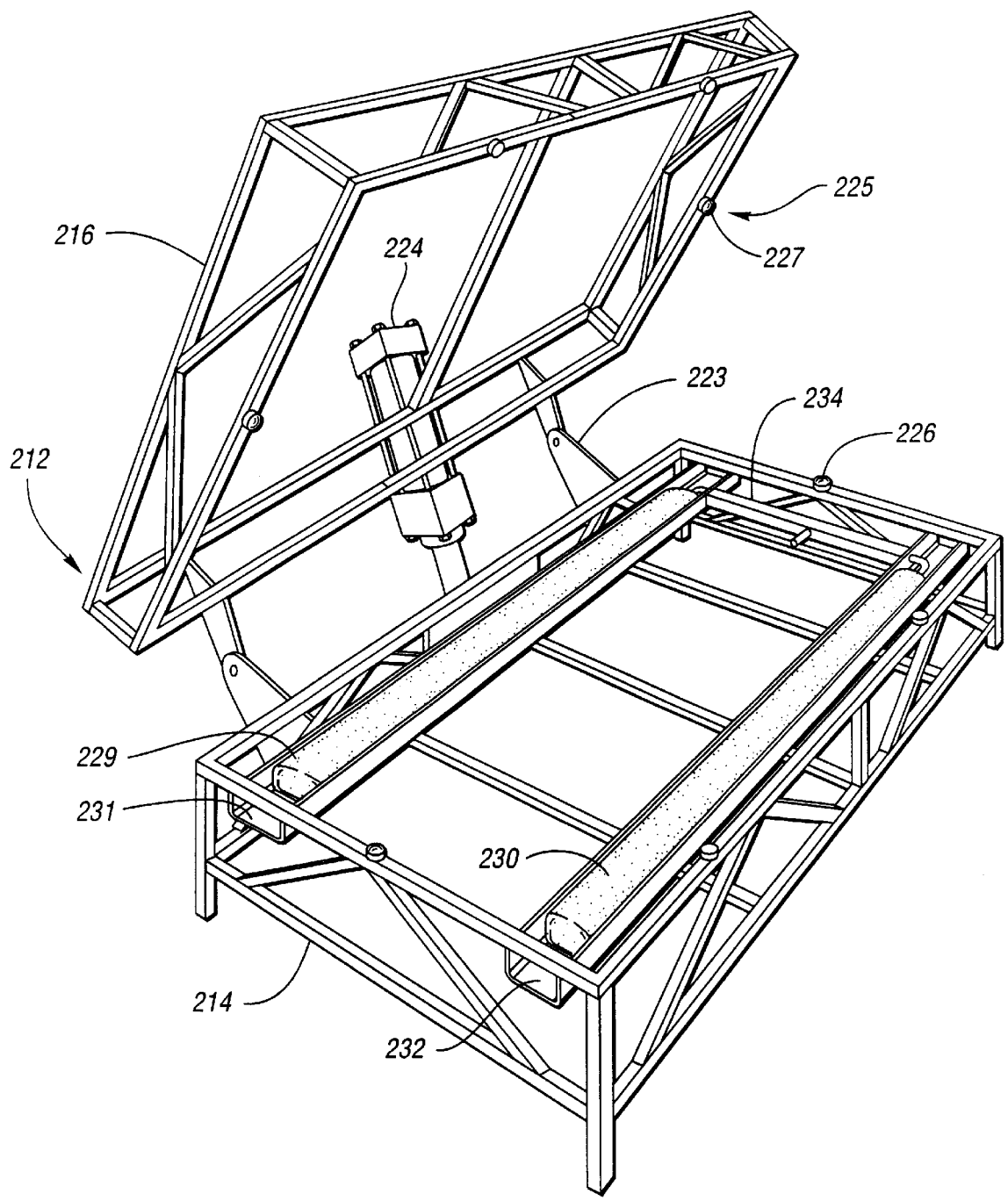
FIG. 6 is a perspective view of the frame assembly showing the second frame portion in the open position.
Figure 8:
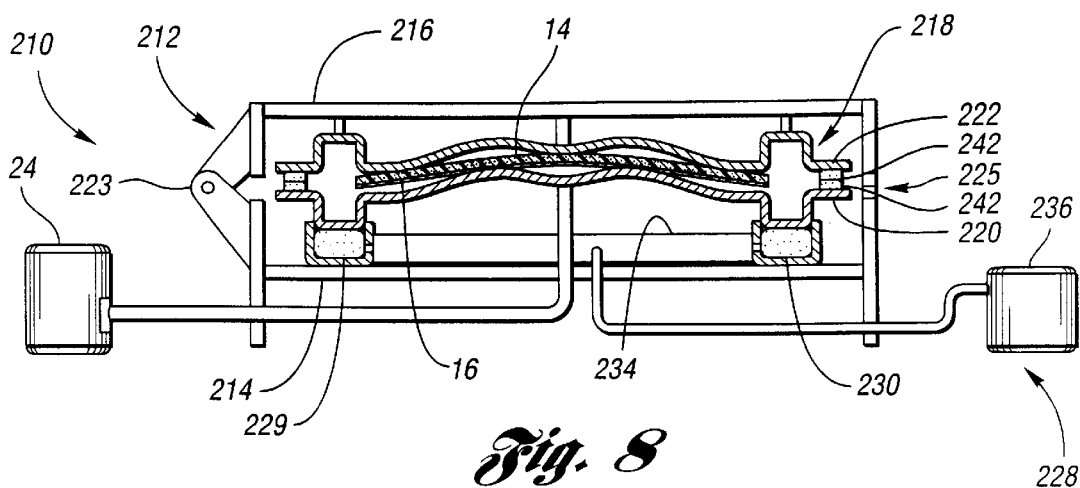
FIG. 8 is a sectional view of the apparatus showing the bladder system inflated to thereby move the first mold section toward the second mold section.

The method of forming the headliner 12 using the apparatus 210 includes positioning the formable layer 14 and the cover member 16 between the mold halves 220 and 222 as shown in FIG. 5. The second frame portion 216 is then moved toward the first frame portion 214 to the closed position as shown in FIG. 7. The air source 236 may then be activated such as by a controller to inflate the bladders 229 and 230, as shown in FIG. 8, thereby moving the first mold half 220 toward the second mold half 222 until the mold halves are sufficiently sealed together. Preferably, but not necessarily, the first mold half 220 is moved toward the second mold half 222 until the seals 242 contact each other and compress slightly. Advantageously, the troughs 231 and 232 guide movement of the first mold half 220 as the bladders 229 and 230 are inflated. Furthermore, the mold 218 may include the floating locators 36 of the apparatus 10 to further align the mold halves 220 and 222.

Figure 9:
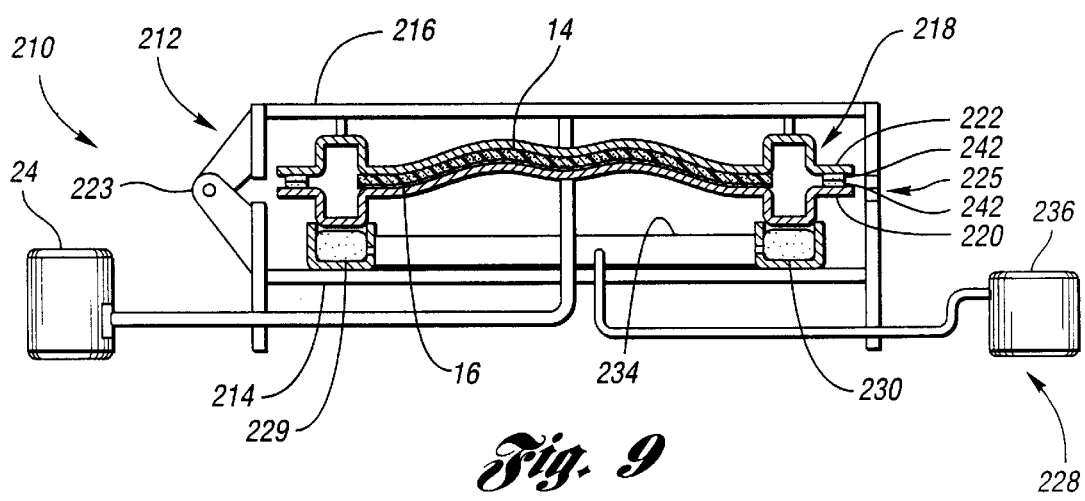
FIG. 9 is a sectional view of the apparatus showing the first mold section further biased toward the second mold section.

Next, the formable layer 14 and cover member 16 may be heated by blowing heated fluid into the mold 218, such as described with respect to the apparatus 110. Alternatively, the formable layer 14 and cover member 16 may be heated prior to being positioned between the mold halves 220 and 222. Vacuum is then developed by the vacuum source 24 to reduce the air pressure within the mold 218 below ambient air pressure. As a result, ambient air pressure forces the mold halves 220 and 222 together, as shown in FIG. 9, thereby thermoforming the headliner 12 while further compressing the seals 242. During the thermoforming process, ambient air pressure may lift the mold half 220 off of the bladders 229 and 230 as shown in FIG. 9.

Figure 10:
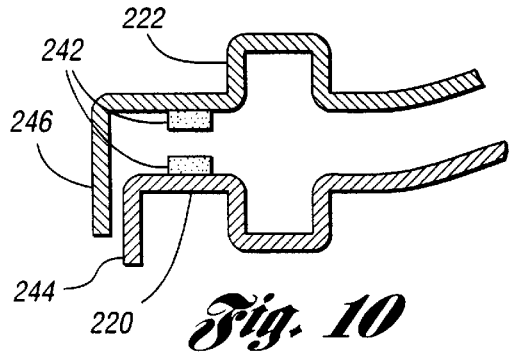
FIG. 10 is a fragmentary sectional view of the mold showing an alternative sealing arrangement.
Figure 11:
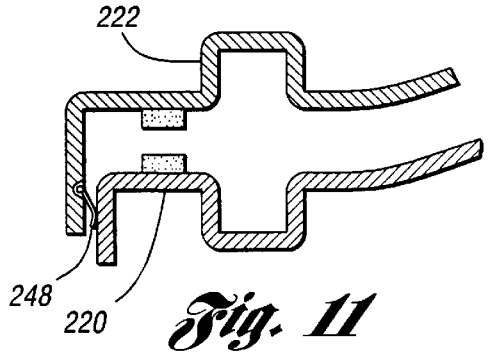
FIG. 11 is a fragmentary sectional view similar to FIG. 10 showing a blade seal disposed between the mold sections.
Figure 12:
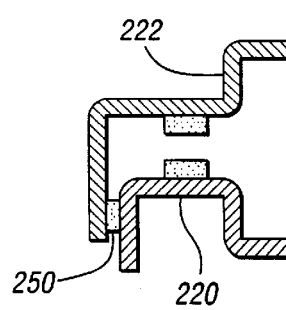
FIG. 12 is a fragmentary sectional view similar to FIG. 10 showing a fibrous material seal disposed between the mold sections.

Referring to FIGS. 10 through 12, alternative or supplemental sealing arrangements for achieving a sufficiently sealed relationship between the mold halves 220 and 222 will now be described. For example, as shown in FIG. 10, the first mold half 220 may be provided with a first seal portion or peripheral flange portion 244 that is configured to nest within a second seal portion or peripheral flange portion 246 of the second mold half 222 when the mold halves 220 and 222 are moved sufficiently close together. In other words, the second flange portion 246 may be configured to overlap the first flange portion 244. Preferably, but not necessarily, the flange portions 244 and 246 define a gap in the range of 0.005 to 0.015 inches when the mold halves 220 and 222 are moved sufficiently close together. With such an arrangement, after the second mold section 222 has been moved to the closed position, the first mold section 220 may be raised by the bladders 229 and 230 until the second flange portion 246 overlaps the first flange portion 244. The vacuum source 24 may then be activated to draw the mold sections 220 and 222 further together so that the seals 242 come into contact with each other and compress each other. Advantageously, before the seals 242 come into contact with each other, air may enter the mold 218 from the surrounding environment thereby cooling the formable layer 14 and cover member 16.

An additional seal, such as a blade seal 248 shown in FIG. 11, or a fibrous material seal 250 shown in FIG. 12, may be attached to one or both flange portions 244 and 246 to improve the sealed relationship between the mold halves 220 and 222. The fibrous material seal 250 preferably comprises a low friction material such as felt.

The invention has been described in an illustrative mainer, and it is to be understood that the terminology which has been used is intended to be in the nature of words of description rather than of limitation. Obviously, many modifications and variations of the invention are possible in light of the above teachings. For example, the method and apparatus of the invention may be used to form various other automotive articles such as package trays, trunk liners, floor liners, hood insulators and door panels, as well as nonautomotive articles such as office dividers and tack boards. As another example, the heating devices and temperature measurement devices described above may be used with any suitable mold to provide mold controlled heating of formable layers and/or cover members. It is, therefore, to be understood that within the scope of the appended claims, the invention may be practiced otherwise than as specifically described.

What is claimed is:

1. An apparatus for forming an article from at least one layer of formable material, the apparatus comprising:

a mold for receiving the at least one layer of formable material, the mold having first and second thin mold sections and a seal associated with at least one of the mold sections for effecting a sufficiently sealed relationship between the mold sections, each mold section having a non-planar configuration, one mold section having at least one aperture; and a vacuum source in fluid communication with the at least one aperture for applying a vacuum pressure to the at least one aperture when the mold sections are sufficiently sealed together in order to reduce air pressure within the mold to thereby cause ambient air pressure to forcefully bias the mold sections sufficiently together so as to form the at least one layer of formable material to a contour corresponding to the non-planar configurations of the mold sections;

wherein each mold section is sufficiently rigid such that the mold sections do not substantially flex when the mold sections are forcefully biased together.

2. The apparatus of claim 1 wherein the seal comprises a flange portion formed as part of one of the mold sections, the flange portion being configured to overlap the other mold section when the mold sections are moved sufficiently close together.

3. The apparatus of claim 1 wherein the seal comprises a compressible seal.

4. The apparatus of claim 1 wherein the seal comprises a blade seal.

5. The apparatus of claim 1 wherein one mold section has a peripheral channel in communication with the at least one aperture.

6. The apparatus of claim 1 wherein a portion of at least one of the mold sections comprises a flexible material.

7. The apparatus of claim 1 wherein the mold sections are pivotally connected together such that at least one mold section is pivotable toward the other mold section.

8. The apparatus of claim 7 wherein the mold includes at least one locator for aligning the mold sections as the at least one mold section is pivoted toward the other mold section, the locator including a locating pin assembly connected to the first mold section, and a receptacle connected to the second mold section, the locating pin assembly including a bullet-shaped locating pin that is engageable with the receptacle.

9. The apparatus of claim 8 wherein the locating pin assembly further includes a housing into which the locating pin extends, wherein the locating pin is moveable with respect to the housing to allow the at least one mold section to pivot toward the other mold section after the locating pin has engaged the receptacle.

10. The apparatus of claim 9 wherein the housing has a first engaging surface, and the receptacle has a second engaging surface engageable with the first engaging surface, wherein when the engaging surfaces are engaged with each other, pivotal movement of the at least one mold section toward the other mold section is inhibited.

11. The apparatus of claim 1 wherein the mold further includes a mold gap measurement device for determining gap thickness between the mold sections.

12. The apparatus of claim 11 wherein the mold gap measurement device includes a magnet connected to one mold section, and a magnetic force detection device connected to the other mold section.

13. The apparatus of claim 11 further comprising a controller in communication with the mold gap measurement device and the vacuum source, the controller being operable to control the vacuum pressure applied by the vacuum source based on the gap thickness between the mold sections.

14. The apparatus of claim 1 further including a heating device for heating the at least one layer of formable material, wherein one of the mold sections includes at least one temperature measurement device in communication with the heating device for determining temperature of a portion of the at least one layer of formable material.

15. The apparatus of claim 14 wherein the heating device includes a plurality of heating elements arranged in a first array, and the one mold section includes a plurality of temperature measurement devices in communication with the heating device and arranged in a second array corresponding to the first array.

16. An apparatus for forming an article from at least one layer of formable material, the apparatus comprising:

a mold for receiving the at least one layer of formable material, the mold having first and second mold sections pivotally connected together, and a compressible seal disposed between the mold sections, each mold section having a non-planar configuration, one mold section having at least one aperture and a peripheral channel in communication with the at least one aperture; and a vacuum source in fluid communication with the at least one aperture and the channel for reducing air pressure within the mold to thereby cause ambient air pressure to forcefully bias the mold sections sufficiently together and compress the seal, so as to form the at least one layer of formable material to a contour corresponding to the non-planar configurations of the mold sections;

wherein each mold section is sufficiently rigid such that the mold sections do not substantially flex when the mold sections are forcefully biased together.

17. An apparatus for forming an article from at least one layer of formable material, the apparatus comprising:

a frame assembly having first and second frame portions pivotally connected together such that at least one of the frame portions is pivotable with respect to the other frame portion between an open position and a closed position, the frame assembly further including an inflatable device connected to the first frame portion;

a mold for receiving the at least one layer of formable material, the mold including first and second mold sections and a seal associated with at least one of the mold sections, the first mold section being cooperable with the inflatable device such that the first mold section is moveable with respect to the first frame portion upon inflation of the inflatable device, the second mold section being connected to the second frame portion, each mold section having a non-planar configuration, one mold section having at least one aperture; and a vacuum source in fluid communication with the at least one aperture;

wherein when the at least one frame portion is in the closed position, the inflatable device is operable for moving the first mold section toward the second mold section to effect a sufficiently sealed relationship between the mold sections, and the vacuum source is operable for reducing air pressure within the mold to thereby cause ambient air pressure to forcefully bias the mold sections sufficiently together so as to form the at least one layer of formable material to a contour corresponding to the non-planar configurations of the mold sections, each mold section being sufficiently rigid such that the mold sections do not substantially flex when the mold sections are forcefully biased together.

18. The apparatus of claim 17 wherein the seal comprises a flange portion formed as part of one of the mold sections, the flange portion being configured to overlap the other mold section when the mold sections are moved sufficiently close together.

19. The apparatus of claim 17 wherein the seal comprises a compressible seal.

20. The apparatus of claim 17 wherein the seal comprises a blade seal.

21. The apparatus of claim 17 wherein the seal comprises a fibrous material.

* * * * *